No. 858,224. PATENTED JUNE 25, 1907.
J. A. SHERRY.
VEHICLE PROPELLING AND STEERING MECHANISM.
APPLICATION FILED DEC. 1, 1906.

2 SHEETS—SHEET 1.

WITNESSES:
E. H. Stewart
A. G. Gardner

James A. Sherry,
INVENTOR.

By C. A. Snow & Co.
ATTORNEYS

No. 858,224.  
PATENTED JUNE 25, 1907.  
J. A. SHERRY.  
VEHICLE PROPELLING AND STEERING MECHANISM.  
APPLICATION FILED DEC. 1, 1906.  
2 SHEETS—SHEET 2.
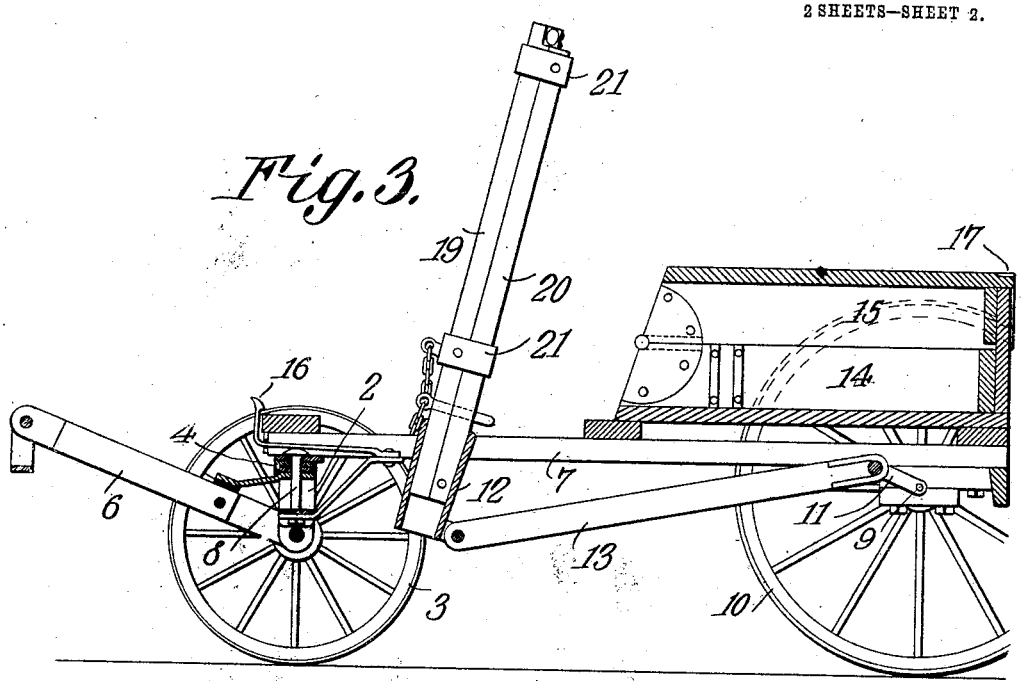
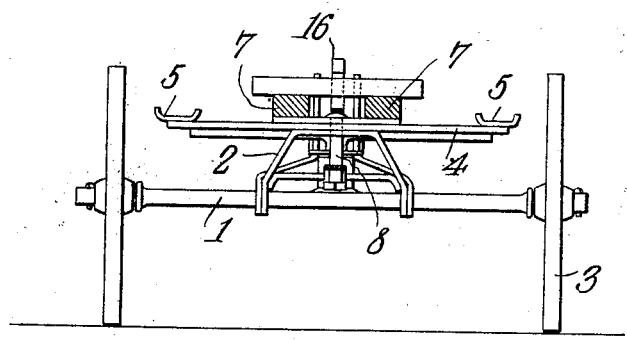
WITNESSES  
James A. Sherry,  
INVENTOR.  
By C. A. Snow & Co.  
ATTORNEYS

UNITED STATES PATENT OFFICE.

JAMES A. SHERRY, OF FALL RIVER, MASSACHUSETTS.

VEHICLE PROPELLING AND STEERING MECHANISM.

No. 858,224.　　　Specification of Letters Patent.　　　Patented June 25, 1907.

Application filed December 1, 1906. Serial No. 345,887.

*To all whom it may concern:*

Be it known that I, JAMES A. SHERRY, a subject of the King of England, residing at Fall River, in the county of Bristol and State of Massachusetts, have invented a new and useful Vehicle Propelling and Steering Mechanism, of which the following is a specification.

This invention has relation to mechanisms for propelling and steering vehicles and it consists in the novel construction and arrangement of its parts as hereinafter shown and described.

The object of the invention is to provide mechanism of the character indicated especially adapted to be used upon toy express wagons and vehicles of similar nature.

The device consists primarily of a pivoted axle having a superstructure provided with pedals upon which the feet of the operator rest for the purpose of turning the axle and steering the vehicle. The said axle is also provided with a rigid stub tongue to the end of which may be bolted a combined tongue and propelling lever. The said tongue and lever is composed of a plurality of sections adapted to slide longitudinally of each other and consequently the tongue may be lengthened or shortened at will. Sills are pivotally mounted at their forward ends upon the superstructure of the pivoted axle and are mounted at their rear end upon the rear axle of the vehicle. The said rear axle is wheel-supported and is provided with an intermediate crank. A socket is pivoted between the sills and a pitman is pivoted at one end to the free end of said socket and at its other end to the crank of the rear axle. Said socket is adapted to receive the combined tongue and lever when the latter is used for propelling the vehicle. A sectional body is mounted upon the sill and the forward portion thereof may be swung back upon the rear portion thereof, thereby forming a seat for the operator when the vehicle is manually propelled by using the said lever. The sections of the body may be arranged in horizontal alinement whereby a complete wagon body is established.

Figure 1:
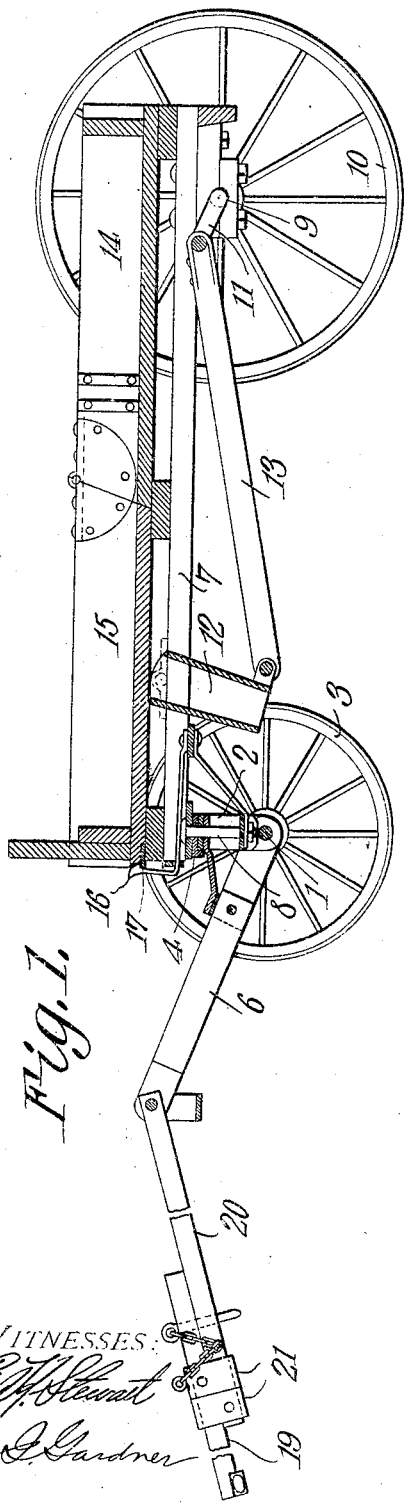
Figure 2:
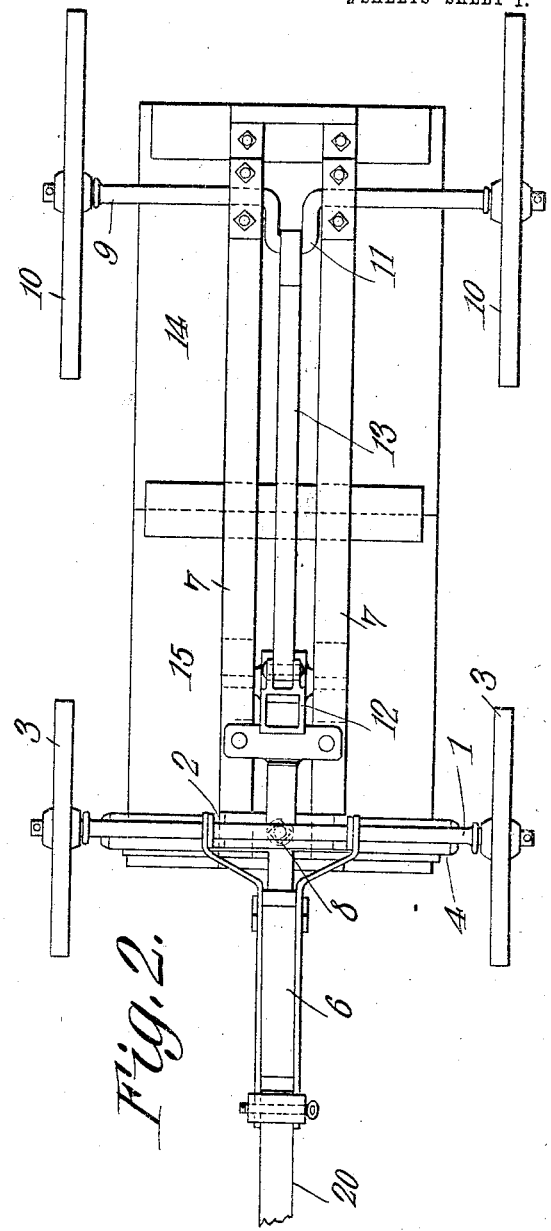

In the accompanying drawing:—Figure 1 is a transverse section of the vehicle. Fig. 2 is a bottom plan view of the same. Fig. 3 is a transverse section of the vehicle with body swung back, and Fig. 4 is a rear elevation of the front axle of the vehicle.

The front axle 1 is provided at its middle with a superstructure 2. The wheels 3 are journaled upon the said axle. The superstructure 3 is provided with a cross bar 4 at the ends of which are located foot-pedals 5. The said cross bar 4 is at all times parallel with the axle 1. The stub tongue 6 is attached to the superstructure 2 in fixed relation thereto. The forward ends of the sills 7 are mounted upon the superstructure 2 and are connected therewith by means of a king bolt 8. The rear ends of said sills are mounted upon the rear axle 9 and the wheels 10 are fixed to the ends of said axle 9. The axle 9 is provided at a point between the sills 7 with a crank 11. The socket 12 is pivotally supported between the sills 7. The pitman 13 is pivoted at its forward end to the rear side and lower end of the socket 12 and at its rear end to the crank 11 of the axle 9. The body of the vehicle is composed of the fixed section 14 and the hinged section 15. The section 14 is mounted upon the rear ends of the sills 7 and the section 15 is hinged to the section 14 in such manner that it may swing from a position in alinement with the same into a position vertically over the same. The catch 16 is supported by the sills 7 and is adapted to engage a lug 17 provided upon the section 15 for holding the said section in horizontal alinement with the section 14. The combined propelling lever and tongue consists of the sections 19 and 20 held together by the bands 21. Said sections may move longitudinally with relation to each other but are confined against independent lateral movement by the said band. When the sections 19 and 20 are lying along their entire length against each other they constitute a propelling lever, the end of which may be inserted in the socket 12, the operator having previously swung the section 15 back upon the body section 14. Thus the bottom of the section 15 may be used as a seat and the operator, by placing his feet upon the pedals 5 may guide the vehicle at the same time that it is propelled manually through the instrumentality of the propelling lever and its attachments.

When it is desired to draw the vehicle, rather than propel the same, the propelling lever is removed from the socket 12 and the sections 19 and 20 are slid longitudinally upon each other thus forming a tongue, the end of which is pivoted to the stub tongue 6.

The hinged section 15 is then swung down into horizontal alinement with the fixed section 14 and the vehicle is converted into an express wagon.

Having described my invention what I claim as new and desire to secure by Letters-Patent is:—

1. A vehicle having a propelling mechanism, steering mechanism and a combined tongue and lever adapted to be interchangeably used in connection with either the propelling or steering mechanism.

2. A vehicle having propelling mechanism, steering mechanism, and an extensible combined tongue and lever adapted to be interchangeably used in connection with either the propelling or steering mechanism.

3. A vehicle having propelling mechanism, steering mechanism and a combined tongue and lever adapted to be interchangeably used in connection with either the propelling or steering mechanism and means for varying the length and thickness of said tongue and lever.

4. A vehicle having propelling mechanism provided with a connecting member, steering mechanism provided with a connecting member and a combined tongue and lever adapted to be interchangeably connected with either of said connecting members.

5. A vehicle having drive wheels and guide wheels, a pivotally mounted socket connected with the drive wheels, a stub tongue connected with the guide wheels and a combined lever and handle adapted to be interchangeably used with either the socket or the stub tongue.

6. A vehicle having drive wheels and guide wheels, a pivotally mounted socket connected with the drive wheels, a superstructure carried by the guide wheels, foot-pedals mounted upon said structure and a combined lever and tongue adapted to be interchangeably applied to the socket or the guide wheels.

7. A vehicle having drive wheels and an axle supported by guide wheels, said axle having a superstructure, the frame of the vehicle being pivotally mounted upon said superstructure, said structure having a cross bar lying parallel with said axles, said cross bar having foot-pedals at its ends, a stub tongue fixed to the superstructure, a socket pivotally mounted and being operatively connected with the drive wheels, a combined lever and tongue adapted to be interchangeably applied to said socket or said stub tongue.

8. A vehicle having propelling mechanism, steering mechanism and a combined lever and tongue consisting of longitudinally slidable sections held together by bands, said combined lever and tongue adapted to be applied to the propelling or steering mechanism.

In testimony that I claim the foregoing as my own, I have hereto affixed my signature in the presence of two witnesses.

JAMES A. SHERRY.

Witnesses:
E. HUME TALBERT,
M. E. COLLIE.